(12) United States Patent
Gertmar

(10) Patent No.: US 6,577,487 B2
(45) Date of Patent: *Jun. 10, 2003

(54) REDUCTION OF HARMONICS IN AC MACHINES

(75) Inventor: Lars Gertmar, Västeras (SE)

(73) Assignee: Asea Brown Boveri AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 159 days.

(21) Appl. No.: 09/194,566
(22) PCT Filed: May 27, 1997
(86) PCT No.: PCT/SE97/00876
§ 371 (c)(1), (2), (4) Date: Nov. 27, 1998
(87) PCT Pub. No.: WO97/45906
PCT Pub. Date: Dec. 4, 1997

(65) Prior Publication Data
US 2002/0027759 A1 Mar. 7, 2002

(30) Foreign Application Priority Data
May 29, 1996 (SE) .............................. 9602078

(51) Int. Cl.⁷ ................................. H02J 3/01
(52) U.S. Cl. ................. 361/113; 307/105; 174/18
(58) Field of Search ............... 361/23, 33, 120, 361/113, 159, 54, 56, 42, 47, 48; 363/39, 44, 43, 47; 30/105; 327/310, 311; 333/175, 176, 173, 174

(56) References Cited

U.S. PATENT DOCUMENTS

| 681,800 | A | 9/1901 | Lasche |
|---|---|---|---|
| 1,304,451 | A | 5/1919 | Burnham |
| 1,418,856 | A | 6/1922 | Williamson |
| 1,481,585 | A | 1/1924 | Beard |

(List continued on next page.)

FOREIGN PATENT DOCUMENTS

| AT | 399790 | 7/1995 |
|---|---|---|
| BE | 565063 | 2/1957 |
| CH | 391071 | 4/1965 |
| CH | 534448 | 2/1973 |
| CH | 539328 | 7/1973 |
| CH | 657482 | 8/1986 |
| DE | 40414 | 8/1887 |
| DE | 277012 | 7/1914 |
| DE | 336418 | 6/1920 |
| DE | 372390 | 3/1923 |

(List continued on next page.)

OTHER PUBLICATIONS

Shipboard Electrical Insulation; G. L. Moses, 1951, pp2&3.
ABB Elkrafthandbok; ABB AB; 1988; pp274–276.
Elkraft teknisk Hanbok, 2 Elmaskiner; A. Alfredsson et al; 1988, pp 121–123.
High Voltage Cables in a New Class of Generators Powerformer; M. Leijon et al; Jun. 14, 1999; pp1–8.
Ohne Transformator direkt ins Net; Owman et al, ABB, AB; Feb. 8, 1999; pp48–51.
Submersible Motors and Wet–Rotor Motors for Centrifugal Pumps Submerged in the Fluid Handled; K. . Bienick, KSB; Feb. 25, 1988; pp9–17.

(List continued on next page.)

Primary Examiner—Kim Huynh
(74) Attorney, Agent, or Firm—Dykema Gossett PLLC

(57) ABSTRACT

Connection arrangements are employed for reducing the effect of third-hannonic voltages in case of direct connection of AC machines to a three-phase distribution or transmission network, wherein the stator winding of the AC machine is Y-connected and wherein the neutral point of the winding is available. An exemplary embodiment employs a suppression filter turned to the third-harmonic, with an overvoltage protection device arranged between the neutral point and ground of the power network.

6 Claims, 1 Drawing Sheet

U.S. PATENT DOCUMENTS

| | | |
|---|---|---|
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,865,409 A * | 6/1932 | Boehne ...................... 361/133 |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,721,905 A | 10/1955 | Monroe |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,560,777 A | 2/1971 | Moeller |
| 3,593,123 A | 7/1971 | Williamson |
| 3,631,519 A | 12/1971 | Salahshourian |
| 3,644,662 A | 2/1972 | Salahshourian |
| 3,651,402 A | 3/1972 | Leffmann |
| 3,670,192 A | 6/1972 | Andersson et al. |
| 3,675,056 A | 7/1972 | Lenz |
| 3,684,821 A | 8/1972 | Miyauchi et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,746,954 A | 7/1973 | Myles et al. |
| 3,778,891 A | 12/1973 | Amasino et al. |
| 3,781,739 A | 12/1973 | Meyer |
| 3,792,399 A | 2/1974 | McLymman |
| 3,801,843 A | 4/1974 | Corman et al. |
| 3,809,933 A | 5/1974 | Sugawara et al. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,995,785 A | 12/1976 | Arick et al. |
| 4,001,616 A | 1/1977 | Lonseth et al. |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |
| 4,262,209 A | 4/1981 | Berner |
| 4,274,027 A | 6/1981 | Higuchi et al. |
| 4,281,264 A | 7/1981 | Keim et al. |
| 4,292,558 A | 9/1981 | Flick et al. |
| 4,307,311 A | 12/1981 | Grozinger |
| 4,308,476 A | 12/1981 | Schuler |
| 4,308,575 A | 12/1981 | Mase |
| 4,310,966 A | 1/1982 | Brietenbach |
| 4,317,001 A | 2/1982 | Silver et al. |
| 4,320,645 A | 3/1982 | Stanley |
| 4,321,518 A | 3/1982 | Akamatsu |
| 4,330,726 A | 5/1982 | Albright et al. |
| 4,337,922 A | 7/1982 | Streiff et al. |
| 4,341,989 A | 7/1982 | Sandberg et al. |
| 4,347,449 A | 8/1982 | Beau |
| 4,347,454 A | 8/1982 | Gellert et al. |
| 4,353,612 A | 10/1982 | Meyers |
| 4,357,542 A | 11/1982 | Kirschbaum |
| 4,360,748 A | 11/1982 | Raschbichler et al. |
| 4,367,425 A | 1/1983 | Mendelsohn et al. |

| | | | | | | |
|---|---|---|---|---|---|---|
| 4,368,418 A | 1/1983 | Demello et al. | | 5,067,046 A | 11/1991 | Elton et al. |
| 4,369,389 A | 1/1983 | Lambrecht | | 5,083,360 A | 1/1992 | Valencic et al. |
| 4,371,745 A | 2/1983 | Sakashita | | 5,086,246 A | 2/1992 | Dymond et al. |
| 4,387,316 A | 6/1983 | Katsekas | | 5,094,703 A | 3/1992 | Takaoka et al. |
| 4,403,163 A | 9/1983 | Rarmerding et al. | | 5,097,241 A | 3/1992 | Smith et al. |
| 4,404,486 A | 9/1983 | Keim et al. | | 5,097,591 A | 3/1992 | Wcislo et al. |
| 4,411,710 A | 10/1983 | Mochizuki et al. | | 5,111,095 A | 5/1992 | Hendershot |
| 4,421,284 A | 12/1983 | Pan | | 5,124,607 A | 6/1992 | Rieber et al. |
| 4,425,521 A | 1/1984 | Rosenberry, Jr. et al. | | 5,136,459 A | 8/1992 | Fararooy |
| 4,426,771 A | 1/1984 | Wang et al. | | 5,140,290 A | 8/1992 | Dersch |
| 4,429,244 A | 1/1984 | Nikiten et al. | | 5,153,460 A | 10/1992 | Bovino et al. |
| 4,431,960 A | 2/1984 | Zucker | | 5,168,662 A | 12/1992 | Nakamura et al. |
| 4,443,725 A | 4/1984 | Derderian et al. | | 5,187,428 A | 2/1993 | Hutchison et al. |
| 4,470,884 A | 9/1984 | Carr | | 5,235,488 A | 8/1993 | Koch |
| 4,473,765 A | 9/1984 | Butman, Jr. et al. | | 5,246,783 A | 9/1993 | Spenadel et al. |
| 4,475,075 A | 10/1984 | Munn | | 5,264,778 A | 11/1993 | Kimmel et al. |
| 4,477,690 A | 10/1984 | Nikitin et al. | | 5,304,883 A | 4/1994 | Denk |
| 4,481,438 A | 11/1984 | Keim | | 5,305,961 A | 4/1994 | Errard et al. |
| 4,488,079 A | 12/1984 | Dailey et al. | | 5,321,308 A | 6/1994 | Johncock |
| 4,503,284 A | 3/1985 | Minnick et al. | | 5,323,330 A | 6/1994 | Asplund et al. |
| 4,510,077 A | 4/1985 | Elton | | 5,325,008 A | 6/1994 | Grant |
| 4,517,471 A | 5/1985 | Sachs | | 5,327,637 A | 7/1994 | Britenbach et al. |
| 4,523,249 A | 6/1985 | Arimoto | | 5,341,281 A | 8/1994 | Skibinski |
| 4,538,131 A | 8/1985 | Baier et al. | | 5,343,139 A | 8/1994 | Gyugi et al. |
| 4,546,210 A | 10/1985 | Akiba et al. | | 5,345,375 A * | 9/1994 | Mohan ........................ 363/40 |
| 4,551,780 A | 11/1985 | Canay | | 5,355,046 A | 10/1994 | Weigelt |
| 4,557,038 A | 12/1985 | Wcislo et al. | | 5,365,132 A | 11/1994 | Hann et al. |
| 4,560,896 A | 12/1985 | Vogt et al. | | 5,387,890 A | 2/1995 | Estop et al. |
| 4,565,929 A | 1/1986 | Baskin et al. | | 5,397,513 A | 3/1995 | Steketee, Jr. |
| 4,588,916 A | 5/1986 | Lis | | 5,400,005 A | 3/1995 | Bobry |
| 4,590,416 A | 5/1986 | Porche et al. | | 5,452,170 A | 9/1995 | Ohde et al. |
| 4,594,630 A | 6/1986 | Rabinowitz et al. | | 5,468,916 A | 11/1995 | Litenas et al. |
| 4,607,183 A | 8/1986 | Rieber et al. | | 5,500,632 A | 3/1996 | Halser, III |
| 4,615,109 A | 10/1986 | Wcislo et al. | | 5,510,942 A | 4/1996 | Bock et al. |
| 4,618,795 A | 10/1986 | Cooper et al. | | 5,530,307 A | 6/1996 | Horst |
| 4,619,040 A | 10/1986 | Wang et al. | | 5,545,853 A | 8/1996 | Hildreth |
| 4,633,109 A | 12/1986 | Feigel | | 5,550,410 A | 8/1996 | Titus |
| 4,650,924 A | 3/1987 | Kauffman et al. | | 5,568,371 A * | 10/1996 | Pitel et al. ..................... 363/39 |
| 4,656,316 A | 4/1987 | Meltsch | | 5,583,387 A | 12/1996 | Takeuchi et al. |
| 4,656,379 A | 4/1987 | McCarty | | 5,587,126 A | 12/1996 | Steketee, Jr. |
| 4,677,328 A | 6/1987 | Kumakura | | 5,598,137 A | 1/1997 | Alber et al. |
| 4,687,882 A | 8/1987 | Stone et al. | | 5,607,320 A | 3/1997 | Wright |
| 4,692,731 A | 9/1987 | Osinga | | 5,612,510 A | 3/1997 | Hildreth |
| 4,723,104 A | 2/1988 | Rohatyn | | 5,663,605 A | 9/1997 | Evans et al. |
| 4,737,704 A | 4/1988 | Kalinnikov et al. | | 5,668,418 A * | 9/1997 | Carlsson et al. ............ 307/105 |
| 4,745,314 A | 5/1988 | Nakano | | 5,672,926 A | 9/1997 | Brandes et al. |
| 4,766,365 A | 8/1988 | Bolduc et al. | | 5,689,223 A | 11/1997 | Demarmels et al. |
| 4,785,138 A | 11/1988 | Brietenbach et al. | | 5,807,447 A | 9/1998 | Forrest |
| 4,795,933 A | 1/1989 | Sakai | | 5,867,358 A * | 2/1999 | Campbell .................... 361/47 |
| 4,827,172 A | 5/1989 | Kobayashi | | | | |
| 4,845,308 A | 7/1989 | Womack, Jr. et al. | | FOREIGN PATENT DOCUMENTS | | |
| 4,847,747 A | 7/1989 | Abbondanti | | DE | 387973 | 1/1924 |
| 4,853,565 A | 8/1989 | Elton et al. | | DE | 425551 | 2/1926 |
| 4,859,810 A | 8/1989 | Cloetens et al. | | DE | 426793 | 3/1926 |
| 4,860,430 A | 8/1989 | Raschbichler et al. | | DE | 432169 | 7/1926 |
| 4,864,266 A | 9/1989 | Feather et al. | | DE | 433749 | 9/1926 |
| 4,883,230 A | 11/1989 | Lindstrom | | DE | 435608 | 10/1926 |
| 4,894,284 A | 1/1990 | Yamanouchi et al. | | DE | 435609 | 10/1926 |
| 4,914,386 A | 4/1990 | Zocholl | | DE | 441717 | 3/1927 |
| 4,918,347 A | 4/1990 | Takaba | | DE | 443011 | 4/1927 |
| 4,918,835 A | 4/1990 | Wcislo et al. | | DE | 460124 | 5/1928 |
| 4,924,342 A | 5/1990 | Lee | | DE | 482506 | 9/1929 |
| 4,926,079 A | 5/1990 | Niemela et al. | | DE | 501181 | 7/1930 |
| 4,942,326 A | 7/1990 | Butler, III et al. | | DE | 523047 | 4/1931 |
| 4,949,001 A | 8/1990 | Campbell | | DE | 568508 | 1/1933 |
| 4,994,952 A | 2/1991 | Silva et al. | | DE | 572030 | 3/1933 |
| 4,997,995 A | 3/1991 | Simmons et al. | | DE | 584639 | 9/1933 |
| 5,012,125 A | 4/1991 | Conway | | DE | 586121 | 10/1933 |
| 5,036,165 A | 7/1991 | Elton et al. | | DE | 604972 | 11/1934 |
| 5,036,238 A | 7/1991 | Tajima | | DE | 629301 | 4/1936 |
| 5,066,881 A | 11/1991 | Elton et al. | | DE | 673545 | 3/1939 |

| | | | | | |
|---|---|---|---|---|---|
| DE | 719009 | 3/1942 | EP | 0684679 | 11/1995 |
| DE | 846583 | 8/1952 | EP | 0684682 | 11/1995 |
| DE | 875227 | 4/1953 | EP | 0695019 | 1/1996 |
| DE | 1807391 | 5/1970 | EP | 0732787 | 9/1996 |
| DE | 2050674 | 5/1971 | EP | 0738034 | 10/1996 |
| DE | 1638176 | 6/1971 | EP | 0740315 | 10/1996 |
| DE | 2155371 | 5/1973 | EP | 0751605 | 1/1997 |
| DE | 2400698 | 7/1975 | EP | 0780926 | 6/1997 |
| DE | 2520511 | 11/1976 | EP | 0802542 | 10/1997 |
| DE | 2656389 | 6/1978 | FR | 805544 | 4/1936 |
| DE | 2721905 | 11/1978 | FR | 841351 | 1/1938 |
| DE | 137164 | 8/1979 | FR | 847899 | 12/1938 |
| DE | 138840 | 11/1979 | FR | 1011924 | 4/1949 |
| DE | 2824951 | 12/1979 | FR | 1126975 | 3/1955 |
| DE | 2835386 | 2/1980 | FR | 1238795 | 7/1959 |
| DE | 2839517 | 3/1980 | FR | 2108171 | 5/1972 |
| DE | 2854520 | 6/1980 | FR | 2251938 | 6/1975 |
| DE | 3009102 | 9/1980 | FR | 2305879 | 10/1976 |
| DE | 2913697 | 10/1980 | FR | 2376542 | 7/1978 |
| DE | 2920478 | 12/1980 | FR | 2467502 | 4/1981 |
| DE | 3028777 | 3/1981 | FR | 2556146 | 6/1985 |
| DE | 2939004 | 4/1981 | FR | 2594271 | 8/1987 |
| DE | 3006382 | 8/1981 | FR | 2708157 | 1/1995 |
| DE | 3008818 | 9/1981 | GB | 123906 | 3/1919 |
| DE | 3305225 | 8/1984 | GB | 268271 | 3/1927 |
| DE | 3309051 | 9/1984 | GB | 293861 | 11/1928 |
| DE | 3441311 | 5/1986 | GB | 292999 | 4/1929 |
| DE | 3543106 | 6/1987 | GB | 319313 | 7/1929 |
| DE | 2917717 | 8/1987 | GB | 518993 | 3/1940 |
| DE | 3612112 | 10/1987 | GB | 537609 | 6/1941 |
| DE | 3726346 | 2/1989 | GB | 540456 | 10/1941 |
| DE | 4023903 | 11/1991 | GB | 589071 | 6/1947 |
| DE | 4022476 | 1/1992 | GB | 685416 | 1/1953 |
| DE | 4233558 | 3/1994 | GB | 702892 | 1/1954 |
| DE | 4409794 | 8/1995 | GB | 715226 | 9/1954 |
| DE | 4412761 | 10/1995 | GB | 723457 | 2/1955 |
| DE | 4420322 | 12/1995 | GB | 763761 | 12/1956 |
| DE | 19547229 | 6/1997 | GB | 805721 | 12/1958 |
| EP | 049104 | 4/1982 | GB | 827600 | 2/1960 |
| EP | 0493704 | 4/1982 | GB | 854728 | 11/1960 |
| EP | 0056580 A1 | 7/1982 | GB | 870583 | 6/1961 |
| EP | 078908 | 5/1983 | GB | 913386 | 12/1962 |
| EP | 0120154 | 10/1984 | GB | 965741 | 8/1964 |
| EP | 0130124 | 1/1985 | GB | 992249 | 5/1965 |
| EP | 0142813 | 5/1985 | GB | 1024583 | 3/1966 |
| EP | 0155405 | 9/1985 | GB | 1053337 | 12/1966 |
| EP | 0174783 | 3/1986 | GB | 1059123 | 2/1967 |
| EP | 0234521 | 9/1987 | GB | 1103098 | 2/1968 |
| EP | 0244069 | 11/1987 | GB | 1103099 | 2/1968 |
| EP | 0246377 | 11/1987 | GB | 1117401 | 6/1968 |
| EP | 0265868 | 5/1988 | GB | 1135242 | 12/1968 |
| EP | 0274691 | 7/1988 | GB | 1147049 | 4/1969 |
| EP | 0280759 | 9/1988 | GB | 1157885 | 7/1969 |
| EP | 0282876 | 9/1988 | GB | 1174659 | 12/1969 |
| EP | 0309096 | 3/1989 | GB | 1236082 | 6/1971 |
| EP | 0314860 | 5/1989 | GB | 1268770 | 3/1972 |
| EP | 0316911 | 5/1989 | GB | 1319257 | 6/1973 |
| EP | 0317248 | 5/1989 | GB | 1322433 | 7/1973 |
| EP | 0335430 | 10/1989 | GB | 1340983 | 12/1973 |
| EP | 0342554 | 11/1989 | GB | 1341050 | 12/1973 |
| EP | 0375101 | 6/1990 | GB | 1365191 | 8/1974 |
| EP | 0406437 | 1/1991 | GB | 1395152 | 5/1975 |
| EP | 0439410 | 7/1991 | GB | 1424982 | 2/1976 |
| EP | 0440865 | 8/1991 | GB | 1426594 | 3/1976 |
| EP | 0490705 | 6/1992 | GB | 1438610 | 6/1976 |
| EP | 0571155 | 11/1993 | GB | 1445284 | 8/1976 |
| EP | 0620570 | 10/1994 | GB | 1479904 | 7/1977 |
| EP | 0642027 | 3/1995 | GB | 1493163 | 11/1977 |
| EP | 0671632 | 9/1995 | GB | 1502938 | 3/1978 |
| EP | 0676777 | 10/1995 | GB | 1525745 | 9/1978 |
| EP | 0677915 | 10/1995 | GB | 2000625 | 1/1979 |

| | | | | | |
|---|---|---|---|---|---|
| GB | 1548633 | 7/1979 | WO | WO9622607 | 7/1996 |
| GB | 2046142 | 11/1979 | WO | WO9630144 | 10/1996 |
| GB | 2022327 | 12/1979 | WO | WO9710640 | 3/1997 |
| GB | 2025150 | 1/1980 | WO | WO9711831 | 4/1997 |
| GB | 2034101 | 5/1980 | WO | WO9716881 | 5/1997 |
| GB | 1574796 | 9/1980 | WO | WO9745288 | 12/1997 |
| GB | 2070341 | 9/1981 | WO | WO9745847 | 12/1997 |
| GB | 2070470 | 9/1981 | WO | WO9745848 | 12/1997 |
| GB | 2071433 | 9/1981 | WO | WO9745906 | 12/1997 |
| GB | 2081523 | 2/1982 | WO | WO9745907 | 12/1997 |
| GB | 2099635 | 12/1982 | WO | WO9745912 | 12/1997 |
| GB | 2105925 | 3/1983 | WO | WO9745914 | 12/1997 |
| GB | 2106306 | 4/1983 | WO | WO9745915 | 12/1997 |
| GB | 2106721 | 4/1983 | WO | WO9745916 | 12/1997 |
| GB | 2136214 | 9/1984 | WO | WO9745918 | 12/1997 |
| GB | 2140195 | 11/1984 | WO | WO9745919 | 12/1997 |
| GB | 2268337 | 1/1994 | WO | WO9745920 | 12/1997 |
| GB | 2273819 | 6/1994 | WO | WO9745921 | 12/1997 |
| GB | 2283133 | 4/1995 | WO | WO9745922 | 12/1997 |
| GB | 2289992 | 12/1995 | WO | WO9745923 | 12/1997 |
| GB | 2308490 | 6/1997 | WO | WO9745924 | 12/1997 |
| JP | 60206121 | 3/1959 | WO | WO9745925 | 12/1997 |
| JP | 57043529 | 8/1980 | WO | WO9745926 | 12/1997 |
| JP | 59076156 | 10/1982 | WO | WO9745927 | 12/1997 |
| JP | 59159642 | 2/1983 | WO | WO9745928 | 12/1997 |
| JP | 6264964 | 9/1985 | WO | WO9745929 | 12/1997 |
| JP | 1129737 | 5/1989 | WO | WO9745930 | 12/1997 |
| JP | 3245748 | 2/1990 | WO | WO9745931 | 12/1997 |
| JP | 4179107 | 11/1990 | WO | WO9745932 | 12/1997 |
| JP | 318253 | 1/1991 | WO | WO9745933 | 12/1997 |
| JP | 424909 | 1/1992 | WO | WO9745934 | 12/1997 |
| JP | 5290947 | 4/1992 | WO | WO9745935 | 12/1997 |
| JP | 6196343 | 12/1992 | WO | WO9745936 | 12/1997 |
| JP | 6233442 | 2/1993 | WO | WO9745937 | 12/1997 |
| JP | 6325629 | 5/1993 | WO | WO9745938 | 12/1997 |
| JP | 7057951 | 8/1993 | WO | WO9745939 | 12/1997 |
| JP | 7264789 | 3/1994 | WO | WO9747067 | 12/1997 |
| JP | 8167332 | 12/1994 | WO | WO9820595 | 5/1998 |
| JP | 8264039 | 11/1995 | WO | WO9820596 | 5/1998 |
| JP | 9200989 | 1/1996 | WO | WO9820597 | 5/1998 |
| LU | 67199 | 3/1972 | WO | WO 98/20598 | 5/1998 |
| SE | 90308 | 9/1937 | WO | WO9820600 | 5/1998 |
| SE | 305899 | 11/1968 | WO | WO 98/20602 | 5/1998 |
| SE | 255156 | 2/1969 | WO | WO9821385 | 5/1998 |
| SE | 341428 | 12/1971 | WO | WO9827634 | 6/1998 |
| SE | 453236 | 1/1982 | WO | WO9827635 | 6/1998 |
| SE | 457792 | 6/1987 | WO | WO9827636 | 6/1998 |
| SE | 502417 | 12/1993 | WO | WO9829927 | 7/1998 |
| SU | 792302 | 1/1971 | WO | WO9829928 | 7/1998 |
| SU | 425268 | 9/1974 | WO | WO9829929 | 7/1998 |
| SU | 1019553 | 1/1980 | WO | WO9829930 | 7/1998 |
| SU | 694939 | 1/1982 | WO | WO9829931 | 7/1998 |
| SU | 955369 | 8/1983 | WO | WO9829932 | 7/1998 |
| SU | 1511810 | 5/1987 | WO | WO9833731 | 8/1998 |
| WO | WO8202617 | 8/1982 | WO | WO9833736 | 8/1998 |
| WO | WO8502302 | 5/1985 | WO | WO9833737 | 8/1998 |
| WO | WO9011389 | 10/1990 | WO | WO9834238 | 8/1998 |
| WO | WO9012409 | 10/1990 | WO | WO 98/34239 | 8/1998 |
| WO | WO9101059 | 1/1991 | WO | WO9834240 | 8/1998 |
| WO | WO9101585 | 2/1991 | WO | WO9834241 | 8/1998 |
| WO | WO9107807 | 3/1991 | WO | WO9834242 | 8/1998 |
| WO | WO9109442 | 6/1991 | WO | WO9834243 | 8/1998 |
| WO | WO8115862 | 10/1991 | WO | WO9834244 | 8/1998 |
| WO | WO9201328 | 1/1992 | WO | WO9834245 | 8/1998 |
| WO | WO9203870 | 3/1992 | WO | WO9834246 | 8/1998 |
| WO | WO9321681 | 10/1993 | WO | WO9834247 | 8/1998 |
| WO | WO9406194 | 3/1994 | WO | WO9834248 | 8/1998 |
| WO | WO9518058 | 7/1995 | WO | WO9834249 | 8/1998 |
| WO | WO9522153 | 8/1995 | WO | WO9834250 | 8/1998 |
| WO | WO9524049 | 9/1995 | WO | WO9834309 | 8/1998 |
| WO | WO9622606 | 7/1996 | WO | WO9834312 | 8/1998 |

| | | |
|---|---|---|
| WO | WO9834315 | 8/1998 |
| WO | WO9834321 | 8/1998 |
| WO | WO9834322 | 8/1998 |
| WO | WO9834323 | 8/1998 |
| WO | WO9834325 | 8/1998 |
| WO | WO9834326 | 8/1998 |
| WO | WO9834327 | 8/1998 |
| WO | WO9834328 | 8/1998 |
| WO | WO9834329 | 8/1998 |
| WO | WO9834330 | 8/1998 |
| WO | WO9834331 | 8/1998 |
| WO | WO9917309 | 4/1999 |
| WO | WO9917311 | 4/1999 |
| WO | WO9917312 | 4/1999 |
| WO | WO9917313 | 4/1999 |
| WO | WO9917314 | 4/1999 |
| WO | WO9917315 | 4/1999 |
| WO | WO9917316 | 4/1999 |
| WO | WO9917422 | 4/1999 |
| WO | WO9917424 | 4/1999 |
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO99/19963 | 4/1999 |
| WO | WO9919969 | 4/1999 |
| WO | WO9919970 | 4/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

High Voltage Generators; G. Beschatnov et al; 1977; vol. 48. No. 6 pp1–7.

Eine neue Type von Unterwassermotoren; Electroteschnik und Maschinenbam, 49; Aug. 1931; pp2–3.

Problems in design of the 110–50okV high–voltage generators; Nikiti et al; World Electrotechnical Congress; 6/21–27/77; Section 1. Paper#18.

Manufacture and Testing of Roebel bars; P. Marti et al; 1960, Pub. 86, vol. 8, pp 25–31.

Hydroalternators of 110 to 220 kV Elektrotechn. Obz., vol. 64, No. 3, pp132–136 Mar. 1975; A. Abramov.

Design concepts for an Amorphous Metal Distribution Transformer; E. Boyd et al; IEEE 11/84.

Neue Wege zum Bau zweipoliger Turbogeneratoren bis 2 GVA, 60kV Elecktortechnik und Maschinenbau Wien Janner 1972, Heft 1, Seite 1—11; G. Aichholzer.

Optimizing designs of water–resistant magnet wire; V. Kuzenev et al; Eleck, vol. 59, No. 12, pp35–40, 1988.

Zur Entwicklung der Tauchpumpenmotoren; A. Schanz; KSB, pp19–24.

Direct Generation of alternating current at high voltages; R. Parsons; IEEE Journal, vol. 67 #393, Jan. 15, 1929; pp1065–1080.

Stopfbachslose Umwalzpumpen—ein wichtiges Element im modernen Kraftwerkbau; H. Holz, KSB 1, pp13–19, 1960.

Zur Geschichte der Brown Boveri–Synchron–Maschinen; Vierzig Jahre Generatorbau; Jan.–Feb. 1931 pp15–39.

Technik und Anwendung moderner Tauchpumpen; A. Heumann; 1987.

High capacity synchronous generator having no tooth stator; V.S. Kildishev et al; No. 1, 1977 pp11–16.

Der Asynchronmotor als Antrieb stopfbcichsloser Pumpen; E. Picmaus; Eletrotechnik und Maschinenbay No. 78, pp153–155, 1961.

Low core loss rotating flux transformer; R. F. Krause, et al; American Institute Physics J.Appl.Phys vol. 64 #10 Nov. 1988, pp5376–5378.

An EHV bulk Power transmission line Made with Low Loss XLPE Cable:Ichihara et al; 8/92; pp3–6.

Underground Transmission Systems Reference Book; 1992;pp16–19; pp36–45; pp67–81.

Power System Stability and Control; P. Kundur, 1994; pp23–25; p. 767.

Six phase Synchronous Machine with AC and DC Stator Connections, Part II:Harmonic Studies and a proposed Uninterruptible Power Supply Scheme; R. Schiferl et al.;Aug. 1983 pp 2694–2701.

Six phase Synchronous Machine with AC and DC Stator Connections, Part 1: Equivalent circuit representation and Steady–State Analysis; R. Schiferl et al; Aug. 1983; pp2685–2693.

Reactive Power Compensation; T. Petersson; 1993; pp 1–23.

Permanent Magnet Machines; K. Binns; 1987; pp 9–1 through 9–26.

Hochspannungsaniagen for Wechselstrom; 97. Hochspannungsaufgaben an Generatoren und Motoren; Roth et al; 1938; pp452–455.

Hochspannungsanlagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 60kV; G. Aicholzer; Sep. 1974, pp249–255.

Advanced Turbine–generators– an assessment; A. Appleton, et al; International Conf. Proceedings, Lg HV Elec. Sys. Paris, FR, Aug.–Sep. 1976, vol. I, Section 11–02, p. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

Powerformer™: A giant step in power plant engineering; Owman et al; CIGRE 1998, Paper 11:1–1.

Thin Type DC/DC Converter using a coreless wire transformer; K. Onda et al; Proc. IEEE Power Electronics Spec. Conf., Jun. 1994, pp330–334.

Development of extruded polymer insulated superconducting cable; Jan. 1992.

Transformer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

* cited by examiner

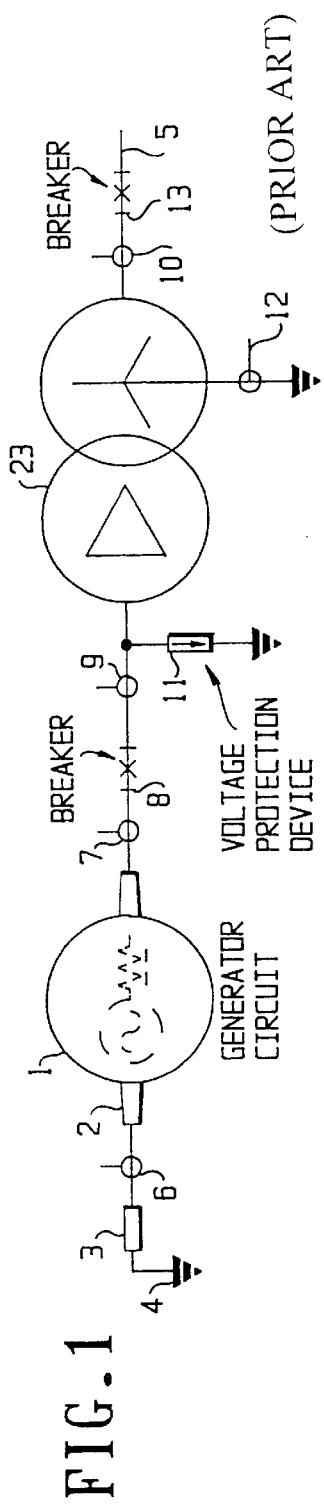
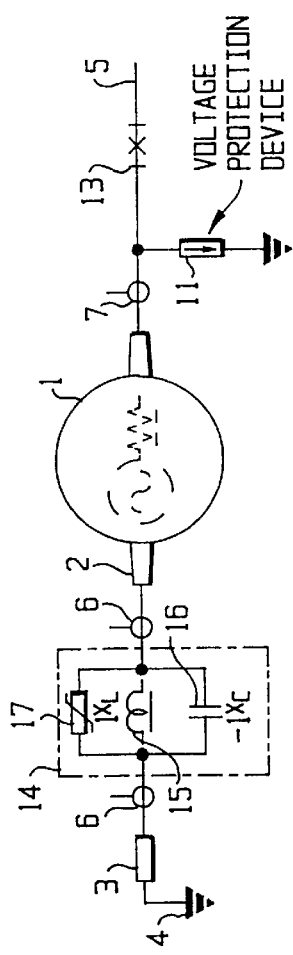
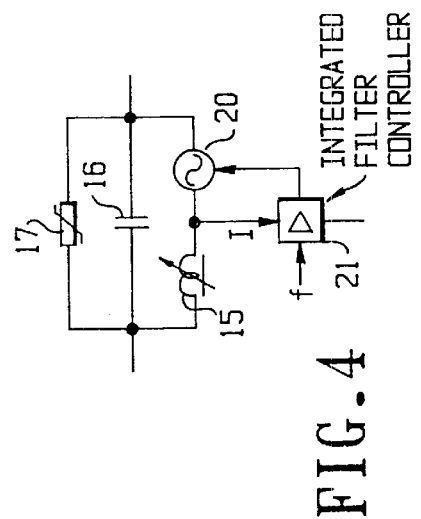

REDUCTION OF HARMONICS IN AC MACHINES

TECHNICAL FIELD

A voltage of a frequency three times the frequency of the network, referred to below as the third harmonic, is generated in different ways in distribution and transmission networks, commonly referred to below as power networks. This voltage generates a third-harmonic current which often causes great problems, on the one hand for apparatus and attachments connected to the power network, and on the other hand for the third-harmonic generating devices themselves. The third-harmonic problems are often directly associated with the way the connected devices are grounded. Because there are several different principles and regulations for grounding in power networks it follows that the methods for reducing influence from third harmonics can be extremely different. The present invention deals with how to reduce the problems with third-harmonic currents that may arise during generator and motor operation of AC machines. The invention consists of a method and a connection arrangement for achieving the above mentioned.

BACKGROUND ART, THE PROBLEM

When calculating and designing three-phase AC machines, the aim is normally to achieve as symmetrical and sinusoidal quantities as possible. With respect to terminals the stator windings of the above-mentioned machines may, when being manufactured, be connected in many different ways. For some machines the stator windings are connected in Δ, for others in Y-connection, where the so-called neutral point sometimes is not drawn out from the machine. For the machines concerned in this invention the three-phase winding is Y-connected and all of the winding ends including the neutral point are drawn out from the machine. In order to obtain an economic yield from the electromagnetic circuit in common types of AC machines, a third-harmonic EMF is generated as a harmonic to the fundamental EMF.

It is well known that the chording of the stator winding may be chosen in order to eliminate one or more of the harmonics. It is also well known regarding synchronous AC machines with salient poles that, in addition, the shape of the EMF of these machines may be influenced and improved by choosing the design of the rotor poles and, especially, the shape of the pole shoes in an appropriate way.

A total elimination of the third harmonic of the voltage by choosing an appropriate size for the winding step however means a considerable reduction, approximately 14%, of the fundamental frequency voltage available for torque generation. This thus means only 86% utilization of the possible rated power. In order to avoid this reduction, the winding step is used mainly for suppression of the fifth harmonic whereby the reduction becomes only a few percent. Adaptation of the shape of the pole shoe is often used for a cost-effective reduction of the seventh harmonic voltage. Elimination or reduction of the harmful effects of the third-harmonic voltage/current must thus be performed by different methods.

When a generator is to be connected directly to an existing power network the grounding of the generator cannot normally be freely chosen due to the fact that this is mainly determined by the grounding method of the existing power network. Concerning grounding, however, there are important criteria which should be fulfilled, namely:

the power network may be directly grounded, resonance-grounded, ungrounded, high-impedance grounded a third-harmonic current through the generator as well as other equipment connected in the power network must for many reasons be limited If the neutral point is connected to the ground of the power network by a relatively high-ohmic impedance for both the fundamental and the third component, increased voltages relative to ground will arise on the unfaulted phases in case of a ground fault. This cannot be accepted on certain markets.

By connecting the neutral point directly, or via an appropriate impedance, to the ground of the power network, this will however allow the AC machine concerned to contribute to obtain appropriate magnitudes of the zero-sequence impedances to be able to handle the fault conditions, for example voltage increases on unfaulted phases, which may arise in the electrical system.

Traditionally, certain criteria should be fulfilled concerning the zero-sequence impedance $R_0+jX_0$ and positive-sequence reactance $X_+$ of the systems. These criteria are often denoted as the following inequalities and state that $$X_0/X_+ < 3 \text{ and } R_0/X_+ < 1$$

In other respects, these inequalities can be interpreted in such a way that in case of a ground fault in one phase, the voltage increase, in the unfaulted phases relative to ground, can be limited to 80%, which is an economical value from the point of view of insulation coordination, of what would have occurred if $X_0$ and/or $R_0 \to \infty$.

The disadvantage with a direct connection of the neutral point to the ground of the power network is that, if the voltages contain a third harmonic, a third-harmonic current will start to flow in the phase conductors which closes its circuit through the ground and/or the neutral conductors. It can be mentioned that there are no regulations prohibiting such an arrangement and that there are such installations in operation.

Concerning low-voltage power networks, there are today in most networks third-harmonic currents which close their circuit through the neutral conductor and cause thermal as well as acoustic problems. The occurrence of and a method of reducing the influence of these third-harmonic currents will be described below.

When it comes to limiting the detrimental effect of the third-harmonic voltage and the third-harmonic current, there are a number of different methods in addition to grounding of the neutral point by means of appropriate impedances.

A relatively common method of grounding is to connect a high-ohmic resistance to a point on the power network which is always connected. This can be done by means of a Z/0-connected transformer connected to the network. To obtain the required selective ground fault protection devices, however, the resistance should be dimensioned such that at least, a ground fault current at full neutral point voltage is obtained.

Another common method for handling the third-harmonic problems for generator plants where the neutral point is available and which, in addition has obvious advantages with regard to limiting fault current in case of a ground fault in the generator appears from the accompanying FIG. 1. A generator 1 has the neutral point 2 via an impedance 3, low ohmic resistor often a neutral-point resistor dimensioned for ground fault current of some harmless 10–20 amperes or so, connected to the ground of the power network 4. A ground fault in the generator thus can cause a ground-fault current via the impedance, and by controlling the ground fault current, measures can be taken to disconnect the generator or a possible defective phase. The phase voltages of the generator are connected to a Δ/Y–0 connected so-called step-up transformer 3 which has to be dimensioned for full power even if it should not be reason to change the voltage level. A ground fault in the Δ-winding of the transformer is limited, in the same way as for a ground fault in the windings of the generator, to some 10–20 amperes. The third-harmonic voltages with which the generator is afflicted could give a third-harmonic current. However, the third-harmonic voltage is superimposed on the phase voltages of the E-winding but cannot generate any third-harmonic current via the neutral-point resistance to ground. This means that, on the Y-side of the transformer, i.e. on the power network side, no third-harmonic current is sensed. In FIG. 1 the necessary auxiliary power input from the network and the field excitation of the generator are omitted. As is otherwise clear from the figure, current measurement devices 6 and 7 are needed for the ground fault current and for the current delivered from the generator. On the generator side, in addition, both a disconnector and a circuit breaker 8 are needed. For the step-up transformer both current measurement 9 and 10 are needed for incoming and outgoing currents. In addition at the input side of the step-up transformer an overvoltage protection device 11 is needed. The network side is then grounded in a normal way via the neutral point of the Y-side. Also here a current measurement device 12 is needed. On the network side both a disconnector and a circuit breaker 13 are then needed as usual.

The EPRI report EL-3391 "High Voltage Stator Winding Development" describes in Section 4 the interplay with the power network in case of direct connection of superconducting high-voltage generators. 4.1 describes the preferred embodiment, in this publication, of Δ-connected generators, whereby the third-harmonic problems in the power network disappear through the currents circulating in Δ. 4.1.1 and 4.1.2 describe grounding methods. The low zero-sequence impedance is ensured via a shunt-connected transformer.

From what is stated above it is obvious that concerning Y-connected direct-connected high-voltage electric machines, the question of third harmonics is a problem which is not satisfactorily solved.

As mentioned above, low-voltage distribution networks contain an obvious third-harmonic current which is difficult to remedy. This is due to the fact that modern fluorescent lamp fittings, thyristor controllers and power supply units chop or load the line voltage non-linearly. These disturbances influence other apparatus, cause power losses and may affect persons hypersensitive to electricity. The disturbances have an obvious third-harmonic nature. In order to reduce the disturbances there is a filter which is described in ERA 8:1994, page 26, and which is installed into the neutral conductor and means that the effect of the harmful third harmonic disturbances can be drastically reduced.

SUMMARY OF THE INVENTION, ADVANTAGES

To be able to cope with the problems which arise from third-harmonic voltages in case of direct connection of AC machines to a three-phase power network, i.e. when there is no transformer between the AC machine and the three-phase network, according to the invention a special method is used and a connection arrangement, which comprises connecting a suppression filter tuned to the third harmonic between the neutral point in the Y-connected AC machine and the ground of the power network, possibly via a very low-ohmic resistor. The filter comprises a parallel resonance circuit which consists of a reactor with the fundamental reactance $X_L$ connected in parallel with a capacitive reactance with a fundamental value $-jX_C$. The ratio between the reactances to achieve third-harmonic parallel resonance will thus be $$3X_L = X_C/3$$

To limit the voltage across the filter to economic values a conventional overvoltage protection device is included, as an integral part of the filter, and is connected across the parallel resonance circuit. An overvoltage protection device connected in this way also limits the voltage at the neutral point to such values that a tapered insulation can be utilized in the stator winding. This is important especially in very high-voltage AC machines.

The dimensioning of the filter and its overvoltage protection device shall be such that the parallel circuit is capable, during normal operation, of linearly absorbing the third-harmonic voltage from the AC machine. In the event of a fault the overvoltage protection device is to limit the fault voltage so that the fault current is allowed to flow through the overvoltage protection device if the fault is considerable.

There are a number of considerable advantages with an arrangement according to the invention. As is clear, among other things, from the accompanying FIG. 2, which shows an embodiment of the invention, the step-up transformer as well as the associated current measurement devices and circuit-breakers and disconnectors are eliminated.

Because the filter will only be loaded by zero-sequence quantities and even if there will occur a large circulating third-harmonic resonant current, the rated power of the filter will be essentially lower than the rated power of the step-up transformer. This means that a solution to the third-harmonic problems according to the invention will be considerably less cost-demanding than a solution according to the prior art.

BRIEF DESCRIPTION OF THE DRAWINGS

FIG. 1 shows an example of how to proceed, according to prior art, in order to deal with the third-harmonic problems of AC machines which are connected to a three-phase power network. The solution comprises use of a step-up transformer connected in Δ/Y–0.

FIG. 2 shows how the third-harmonic problems is coped with according to the invention with the aid of a third-harmonic suppression filter between the neutral point of the AC machine and the ground of the power network.

FIG. 3 shows a third-harmonic suppression filter according to an embodiment of the invention.

FIG. 4 shows a third-harmonic suppression filter according to another embodiment of the invention.

DESCRIPTION OF THE PREFERRED EMBODIMENTS

One embodiment of the invention is clear from FIG. 2. The reference numbers 1, 2, 3, 4, 5, 6, 7, 11 and 13 refer to the corresponding numbers according to FIG. 1. FIG. 2 also shows the integrated filter 14 with a parallel resonance-circuit comprising a reactor 15 in parallel with a capacitance 16 and across which circuit an over voltage protection device 17 is connected.

Because the filter, in principle, is to absorb a voltage without the reactor reaching saturation, it is essential that the third-harmonic tuning is accurately done and remains stable. With a conventional reactor it may in certain cases be difficult to achieve the sufficient and desired accuracy. Within the scope of the invention there are, therefore, also embodiments which ensure that the suppression frequency of the filter will be three times the actual frequency of the network.

Such an embodiment is clear from FIG. 3. Here a reactor 18 is used which is designed as an electronically controllable reactor with control windings 19. Such a reactor is among other things known from an article "A test installation of a self-tuned ac filter in the Konti-Skan 2 HVDC link", published at IEEE/KTH Stockholm Power Tech conference, Stockholm, Jun. 18–22, 1995. With such a reactor the resonance frequency can be maintained even at minor faults in the capacitor part of the filter and become independent of variations in temperature etc. Using a controllable reactor, however, means that the filter must comprise some kind of measurement of the network frequency or, alternatively, the third-harmonic frequency and a control circuit which, via its executive device and the control winding, ensure that the suppression frequency of the resonance circuit corresponds to the third harmonic.

Another embodiment which ensures a correct suppression frequency is clear from FIG. 4. Here, a voltage source 20 is introduced in the reactor branch of the suppression filter, which voltage source with aid of a controller 21 generates a control voltage. Current through a reactor always means a certain ohmic voltage drop. By measuring the current I in the reactor branch, with knowledge of the resistance of the reactor, the controller can be programmed so that the control voltage compensates for the ohmic voltage drop of the reactor. By measuring the mains frequency f, the controller can be programmed so that the control voltage will be such that the suppression frequency of the filter corresponds to the third harmonic. The required control power is provided, via the controller, from the network.

What is claimed is:

1. A method for reducing the effect of third-harmonic voltages in AC machines for direct connection to a three-phase distribution or transmission network having a ground point, wherein the AC machine includes a Y-connected stator winding with an available neutral point comprising the steps of: connecting a suppression filter, turned to the third harmonic, and an overvoltage protection device between the neutral point and ground of the distribution or transmission network.

2. A connection arrangement for reducing the effect of third-harmonic voltages in AC machines for direct connection to a three-phase distribution or transmission network having a ground, wherein the machine includes a Y-connected stator winding having a neutral point; a suppression filter, tuned to the third harmonic, and an overvoltage protection device; said suppression filter and said over voltage protection device being connected between the neutral point and the ground of the distribution or transmission network.

3. A connection arrangement according to claim 2, wherein the suppression filter comprises a parallel resonance circuit including a reactor and a parallel connected capacitince reactance and the overvoltage protection device is connected in parallel therewith.

4. A connection arrangement according to claim 3, wherein the network has an actual frequency and the reactor comprises a controllable reactor having a control winding for affecting the suppression filter is such that said filter tuned to the third harmonic corresponding to three times the actual frequency of the network.

5. A connection arrangement according to claim 3, wherein the reactor has an ohmic voltage drop and including a controller for producing a control voltage coupled in series with the reactor, said control voltage being operative for at least one of: (a) to compensate the ohmic voltage drop of the reactor; and (b) to affect the suppression filter tuned to the third harmonic to correspond three times the actual frequency of the network.

6. A connection arrangement according to claim 2, comprising a low-ohmic resistor arranged between ground of the distribution or transmission network and the suppression filter (14) tuned to third harmonic.

* * * * *